June 11, 1940.   H. J. IFTIGER ET AL   2,204,015
DISPENSING DEVICE
Filed Aug. 5, 1938
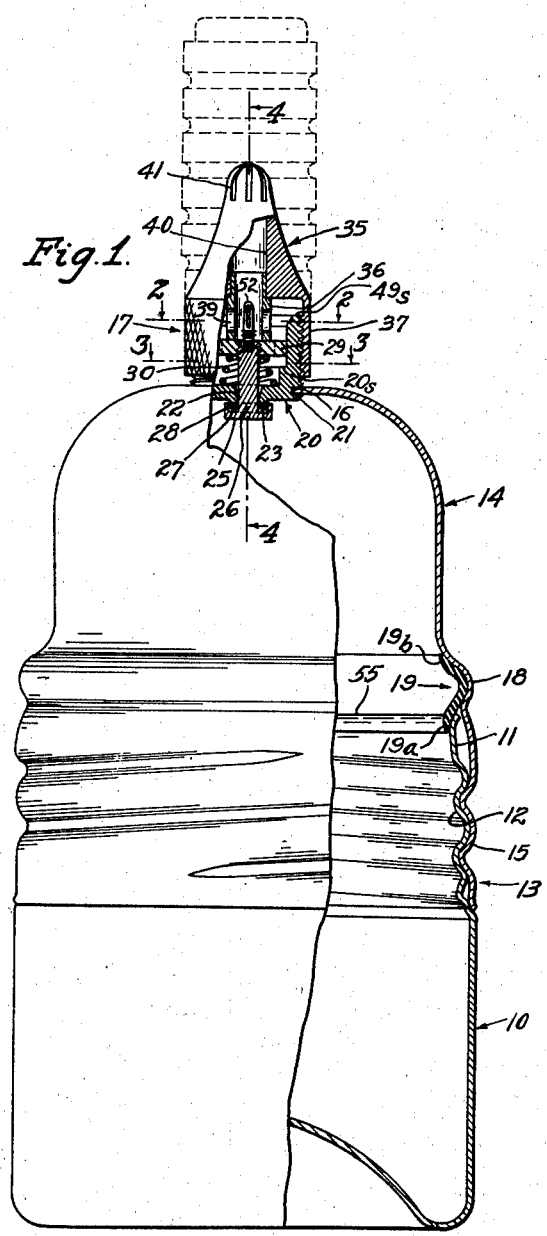
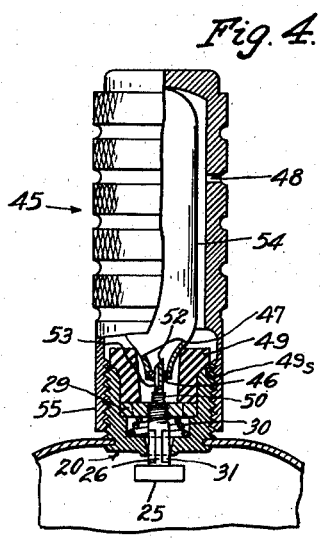
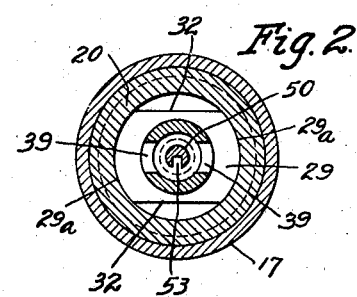
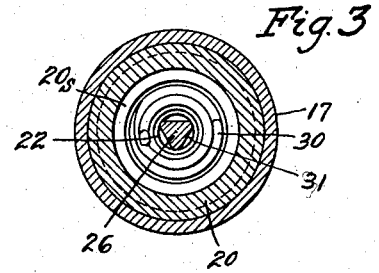
INVENTOR.
HERBERT J. IFTIGER and
ERNEST W. COOK
BY Robt. W. Pearson
ATTORNEYS.

Patented June 11, 1940

2,204,015

UNITED STATES PATENT OFFICE 2,204,015

DISPENSING DEVICE

Herbert J. Iftiger and Ernest W. Cook, Los Angeles, Calif., assignors, by mesne assignments, to Service Devices Corporation, a corporation of Delaware Application August 5, 1938, Serial No. 223,238

1 Claim. (Cl. 225—22)

This invention relates to a method of and a pressure means for producing in cream a condition substantially the same as that known as "whipped cream."

The invention is adapted to convert the ordinary cream from cow's milk into a "whipped" condition either for household use or for any other purpose, and in any situation where it is found necessary or desirable to treat the cream in such a manner as to render it the equivalent of whipped cream.

Although the invention provides a means for converting cream into a condition wherein its fat globules are mechanically disintegrated to a greater extent than is usually accomplished by cream whipping devices now on the market, yet the means whereby this result is accomplished operate upon a very different principle making it possible to simplify the structure of the device and at the same time render it rapid in operation.

Viewed as a method the invention pertains to directing minute swiftly running streams of cream against each other in an angular manner so as to thereby mechanically break up the fat globules of the cream into finer particles, thus rendering them more easily digested by the human stomach.

A further object of the invention is to provide a superior means for aerating the cream simultaneously with reducing the size of its fat globules, as aforesaid.

More specifically speaking, the invention pertains, in part, to an improved stopper operated outlet control structure for fluids bottled under pressure.

Other objects, advantages and features of the invention may hereinafter appear.

Referring to the accompanying drawing, which illustrates what is at present deemed to be a preferred embodiment of the invention, Fig. 1 is a view showing the device embodied in an upstanding fluid-tight container, some parts being shown in vertical mid-section and other parts in side elevation.

Fig. 2 is a cross section on line 2—2 of Fig. 1.

Fig. 3 is a cross section on line 3—3 of Fig. 1.

Fig. 4 is a section on line 4—4 of Fig. 1, being a reproduction of the upper portion of Fig. 1 except that the spout has been removed and replaced by the charging tube.

Referring in detail to the drawing, the main or lower tubular container section or cup 10, desirably made of sheet metal, is shown having an upwardly directed mouth surrounded by an unthreaded annular portion 11 below which threads 12 are formed in the sheet metal wall thereof. On to said cup 10 screws the threaded skirt portion 13 of the dome or upper container section 14, said skirt portion 13 having threads 15 pressed into the sheet metal thereof to cooperate with the aforementioned threads 12.

A packing ring 19, which is outwardly convexed and inwardly concaved as seen in cross section, is provided to make a fluid tight fit between the container sections 10 and 14. Said ring is held in place by an internal annular seat 18 formed in the upper container section 14.

In the assembled structure the member 14 may be defined as an inverted upper cup which is connected in a fluid tight manner with the lower cup 10. In the top of said member 14 is a circular central opening 16 which is normally closed in a fluid tight manner by a stopper structure 17.

Said stopper structure 17 includes the circular stopper cup 20 the bottom portion of which is fitted snugly into said opening 16 and then internally peened over at 21 to insure a fluid tight fit. Said cup 20, in turn, has through its bottom a circular central tapered opening 22, which opening is surrounded by a downwardly directed annular lip 23 formed in the bottom of the cup.

Owing to the fact that the bottom section 10 of the container is detachable from its upper section 14, access is afforded to the interior side of the opening in the latter section to produce the peen 21 at the bottom of the cup shaped closure 20.

A valve structure is provided to control the flow of fluid through said opening 22, this valve structure including a valve head 25 furnished concentrically with a stem 26. Said head 25 has in its upper face an annular groove 27 within which is fitted a gasket 28 with which the lip 23 normally contacts to make a liquid tight fit.

The valve stem 26 is externally screw threaded to have screwed on to it a nut 29, and a compression spring 30 acts between said nut and the bottom of the cup 20 normally to keep the opening or port 22 closed. The lower portion of the stem 26 is cut away or peripherally flattened at 31 at a plurality of points (see Fig. 3) in order to provide discharge passages for the bottled liquid when the valve is depressed against the opposition of the spring 30, and the nut 29 is also flattened externally as indicated at 32 (see Fig. 2) to permit the liquid to pass upwardly out of the mouth of the stopper cup 20. The opposite end portions 29a of said nut have a working fit within the circular wall of said cup 20.

In order to depress the valve structure members 25, 26 and 29 against the opposition of the spring 30 the spout portion 35 of the cap is furnished with a central internal sleeve 36 the lower end of which is abuttable against the nut 29. Said spout portion 35 has a skirt 37 which has a screw threaded fit around the stopper cup 20, thus making it possible to screw the spout member 35 down and cause its internal sleeve 36 to depress the nut 29 and open the port 22.

Owing to its downwardly tapering form the annular passage 22 causes a funnel-shaped expansion of the stream discharged therethrough, which aids in securing the desired "whipped" condition. The taper of said passage also makes it easier to cleanse it.

The downward movement of said nut is limited by the annular shoulder 20s projecting internally from the cup 20.

The sleeve 36 has lateral openings 39 to admit outflowing liquid. The upper portion of said sleeve is tightly fitted within the outlet passage 40 which in turn has a slitted nozzle portion 41.

In Fig. 4 a charging tube 45 is shown screwed on to the container in place of the spout member 35. Said charging tube is of a well known construction, and separately considered, forms no part of the present invention. The invention, however, includes an improved means for puncturing the soft metal closure body 46 of the tube 5 to permit the compressed gas to escape from said tube to charge the container sections 10 and 14. Said puncturing means consists of a pin 50 the end portion 51 of which is externally screw threaded to screw into an internally threaded socket provided therefor in the valve stem 26. The puncturing end of said pin is beveled as shown at 52 and a groove 53 extends from end to end of the pin along the side thereof where said bevel is lowest, said groove forming a channel for the compressed gas to pass through during the charging operation.

The charging tube 45 has within it an inner container 54 the lower outlet end of which is normally closed by the aforesaid soft metal body 46. Said tube 45 also has an internally screw threaded skirt portion 55 of the same diameter as the skirt 37 of the removable spout member 35, thus adapting the charging tube for being screwed on to the container in place of said spout member. The soft metal body 46 is contained within a tapered neck 47 with which the container 54 is provided and is thereby held in a position to be punctured by the member 50. The charging tube 45 is furnished with a vent 48 to release air pressure caused by screwing said tube on to the container. Said tube is also furnished, during the charging operation, with a packing collar 49 having an external annular shoulder 49s around its upper end to abut against the upper end of the cup member 20. Internally said collar 49 has a fluid tight fit around the lower end portion of applied container 54.

Referring to certain details of construction, the packing ring 19 is furnished along its lower edge with a somewhat inwardly directed edge portion or lip 19a externally around which extends the upper edge portion 11 of the lower container section when the two sections of the container are screwed together. Said packing ring also has a like upper lip 19b. Owing to this construction said packing ring, which should be made of a good grade of flexible rubber, forms an effective seal for the compressed liquid, when the liquid level stands thereabove, or for the gas when the liquid level falls below it.

Before the two container sections are screwed together the lower section 10 is filled with the body of liquid 55 and is maintained in an upstanding position while the upper section, carrying the packing ring 19, is screwed thereonto.

In the operation of charging the container the charging tube 45 is screwed down upon the part 17 sufficiently to cause the pin 50 to puncture the soft metal body 46 and thus provide an outlet passage therefrom leading through the groove 53 of the pin 50 into the interior of the stopper structure 17. Screwing down the charging tube to the extent just stated will cause the lower end of the neck 47 of the charging tube to depress the nut 39, carried by the valve stem 26, and thereby open the valve. Hence the charging gas delivered from the charging tube will pass down into the container and will produce the desired pressure upon the upper surface of the liquid body 55 shown therein.

When the charging tube is screwed on to the container a short distance its soft metal closure body 46 will come into contact with the point of the pin 50, but the spring 30 will not offer enough opposition to cause the onscrewing of said tube to puncture said body. However further downscrewing of said tube will bring the inner face of the nut 29 into contact with the annular shoulder 20s thus causing a positive obstruction to the further yielding of the puncturing member, which will then perform its puncturing operation and cause the compressed gas to enter the container. After the container has thus been charged the charging tube is unscrewed therefrom, the valve head 25 resuming its seat as soon as the charging tube has receded sufficiently to allow it to do so. Thereupon the spout member 35 is screwed into place to the extent shown in Fig. 1 and the container is ready to be used as a means for dispensing the liquid contained therein.

In dispensing the liquid the operator, while holding the container in an inverted position over a receptacle into which the liquid is to be discharged, will screw the spout 35 farther on to the neck of the container, thereby causing the internal sleeve 36 of said spout forcibly to engage the nut 39 of the valve structure and open the valve to the desired extent, this unscrewing operation being reversed to permit the valve to close as soon as the desired amount of liquid has been dispensed.

We claim:

A dispensing container having a screwthreaded neck, a valve carried interiorly by said container neck, there being a restricted passage in the lower portion of said neck which is controlled by said valve, said valve having a stem extending axially within said neck, a guide plate carried by said stem and having peripheral portions interiorly engaging said neck with a working fit, said plate having cut-away portions affording outlet passages for fluid, a dispensing cap having an upper nozzle portion and a skirt portion to screw on to said neck, said cap having an axial discharge passage which leads from the space circumscribed by its skirt to its nozzle portion, an axial internal sleeve having its upper end portion secured within the lower portion of the last recited passage and its lower end abuttable against said guide plate to open the valve when the aforesaid cap is secured down, said sleeve having openings to admit the fluid to its interior after it has flowed through the aforesaid cut-away portions of said guide plate, and a spring positioned to act upon the lower side of said guide plate to close said valve when said cap is screwed back to its original position.

HERBERT J. IFTIGER.
ERNEST W. COOK.